(12) United States Patent
Chen et al.

(10) Patent No.: US 7,699,659 B2
(45) Date of Patent: Apr. 20, 2010

(54) SURFACE CONTACT CARD LATCHING ASSEMBLY

(75) Inventors: Rui-Hao Chen, Shenzhen (CN); Peng-Jin Ge, Shenzhen (CN); Ye Liu, Shenzhen (CN); Hsiao-Hua Tu, Tu-Cheng (TW); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1013 days.

(21) Appl. No.: 11/432,999

(22) Filed: May 12, 2006

(65) Prior Publication Data

US 2007/0017989 A1 Jan. 25, 2007

(30) Foreign Application Priority Data

Jul. 22, 2005 (CN) .................... 2005 1 0036154

(51) Int. Cl.
*H01R 24/00* (2006.01)

(52) U.S. Cl. .................... 439/630; 439/159

(58) Field of Classification Search ............. 439/159, 439/630
See application file for complete search history.

(56) References Cited

U.S. PATENT DOCUMENTS 6,503,092 B1 * 1/2003 Sato .................... 439/159

FOREIGN PATENT DOCUMENTS

CN 2142788 Y 9/1993
CN 1072857 C 10/2001

* cited by examiner

*Primary Examiner*—Javaid Nasri
(74) *Attorney, Agent, or Firm*—Frank R. Niranjan (57) ABSTRACT

A surface contact card latching assembly (100) is located in a portable electronic device (200). The latching assembly includes a receiving portion (11) and a latch portion (12). The receiving portion is configured for receiving a surface contact card (20). The receiving portion includes an aperture (113) formed at a first end thereof via which the surface contact card enters or exits, and a latching containing portion (114) formed at an opposite second end thereof. The latch portion is received in the latching containing portion. The latch portion is operable to move in the latching containing portion so as to drive the surface contact card to move out of the receiving portion through the aperture.

17 Claims, 7 Drawing Sheets

SURFACE CONTACT CARD LATCHING ASSEMBLY

TECHNICAL FIELD

The present invention generally relates to assemblies for holding surface contact cards of portable electronic devices and, more particularly, to a latching assembly for holding a SIM card in a portable electronic device.

BACKGROUND

With the development of wireless communication and information processing technologies, portable electronic devices such as mobile phones are now in widespread use. These electronic devices enable consumers to enjoy the convenience of high-tech services anytime and anywhere. Surface contact cards such as subscriber identity module cards (SIMs), compact flash cards (CFs) and multimedia cards (MMCs) having special circuits that are widely used in portable electronic devices to enhance or specialize their functions. For example, a SIM card is placed in a mobile phone to dedicate the mobile phone' functions to the SIM card owner. By changing SIM cards, a single mobile phone can be used by many different SIM card owners as a personal phone.

Figure 1:
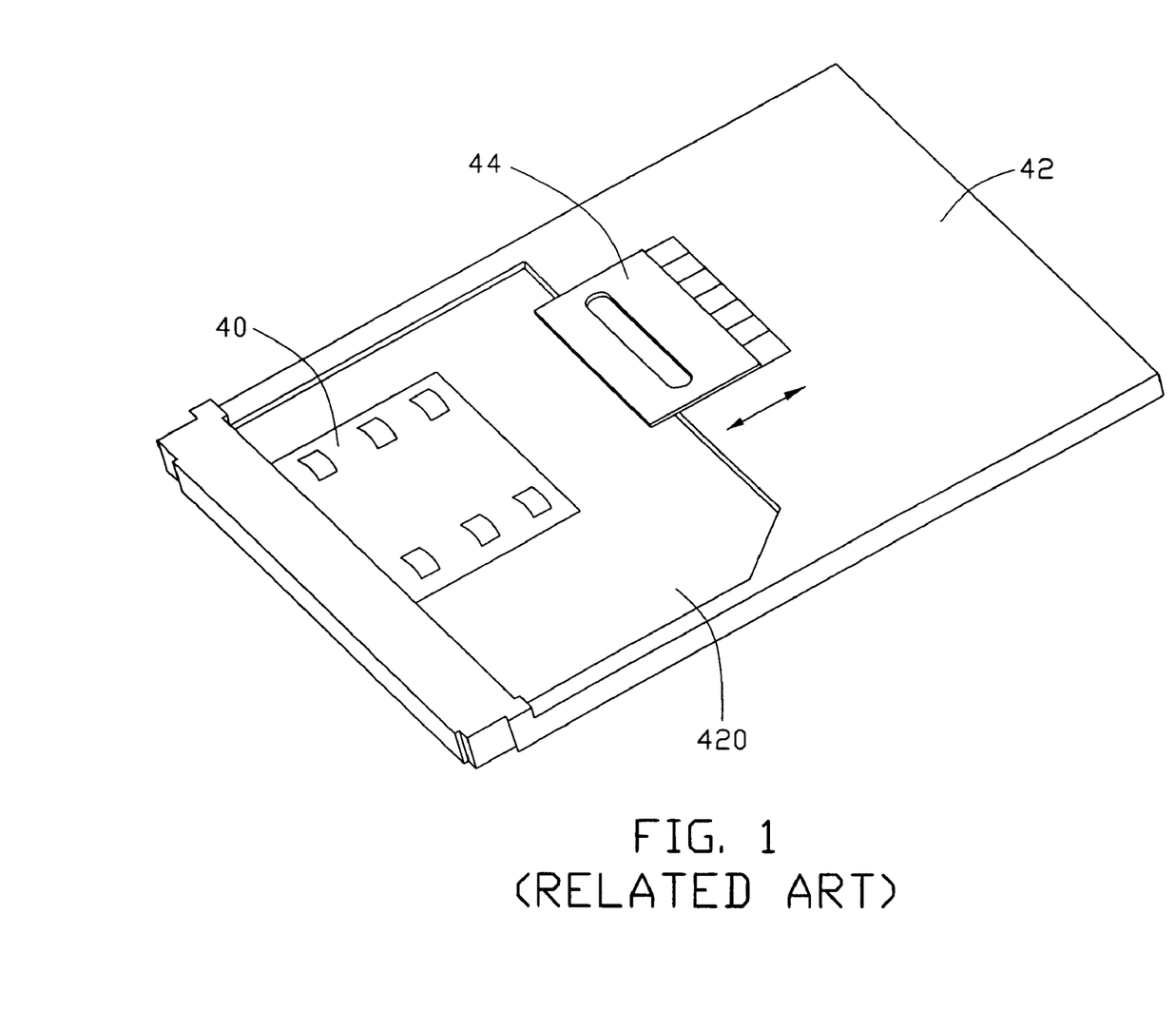
FIG. 1 is an exploded, isometric view of a conventional surface contact card latching assembly.

Referring now to FIG. 1, a typical assembly for holding a SIM card includes a body 42 made of insulating material and a latching structure 44. A receiving groove 420 is defined in the body 42, and a connector 40 including a plurality of contacts is set approximately in the middle of the receiving groove 420. The shape and size of the receiving groove 420 corresponds to that of the SIM card. The latching structure 44 is formed in the body 42, adjacent to the receiving groove 420, and can be moved back and forth along the direction indicated by the arrow shown in FIG. 1.

In use, firstly, the latching structure 44 is moved away from the receiving groove 420, and the SIM card is received in the receiving groove 420. Then, the latching structure 44 is moved adjacent to the receiving groove 420 and located above the receiving groove 420 for latching the SIM card into the receiving groove 420. In the same way, the SIM card can be released by moving the latching structure 44 away from the receiving groove 420.

In the above assembly for holding a SIM card, the latching structure 44 can easily be moved. If a mobile phone employing such an assembly for holding a SIM card drops to ground, shock can easily force the latching structure 44 to move off the receiving groove 420. As a result, the SIM card will not connect well with the connector 40 or could even be released from the receiving groove 420. Obviously, such an assembly is not a trustworthy way of holding the SIM card steadily in the receiving groove 420.

Therefore, there is a need for a new surface contact card latching assembly, which can hold the surface contact card steadily in a portable electronic device.

SUMMARY

A surface contact card latching assembly is located in a portable electronic device. The latching assembly includes a receiving portion and a latch portion. The receiving portion is configured for receiving a surface contact card. The receiving portion includes an aperture formed at a first end thereof via which the surface contact card enters or exits, and a latching containing portion formed at an opposite second end thereof. The latch portion is received in the latching containing portion. The latch portion is operable to move in the latching containing portion so as to drive the surface contact card to move out of the receiving portion through the aperture.

Other novel features will become more apparent from the following detailed description, when taken in conjunction with the accompanying drawings.

BRIEF DESCRIPTION OF THE DRAWINGS

Many aspects of the surface contact card latching assembly can be better understood with reference to the following drawings. The components in the drawings are not necessarily drawn to scale, the emphasis instead being placed upon clearly illustrating the principles of the present latching assembly. Moreover, in the drawings, like reference numerals designate corresponding parts throughout the several views.

DETAILED DESCRIPTION OF THE EMBODIMENTS

The present latching assembly is suitable for portable electronic devices, such as mobile phones, PDAs, and so on.

Figure 2:
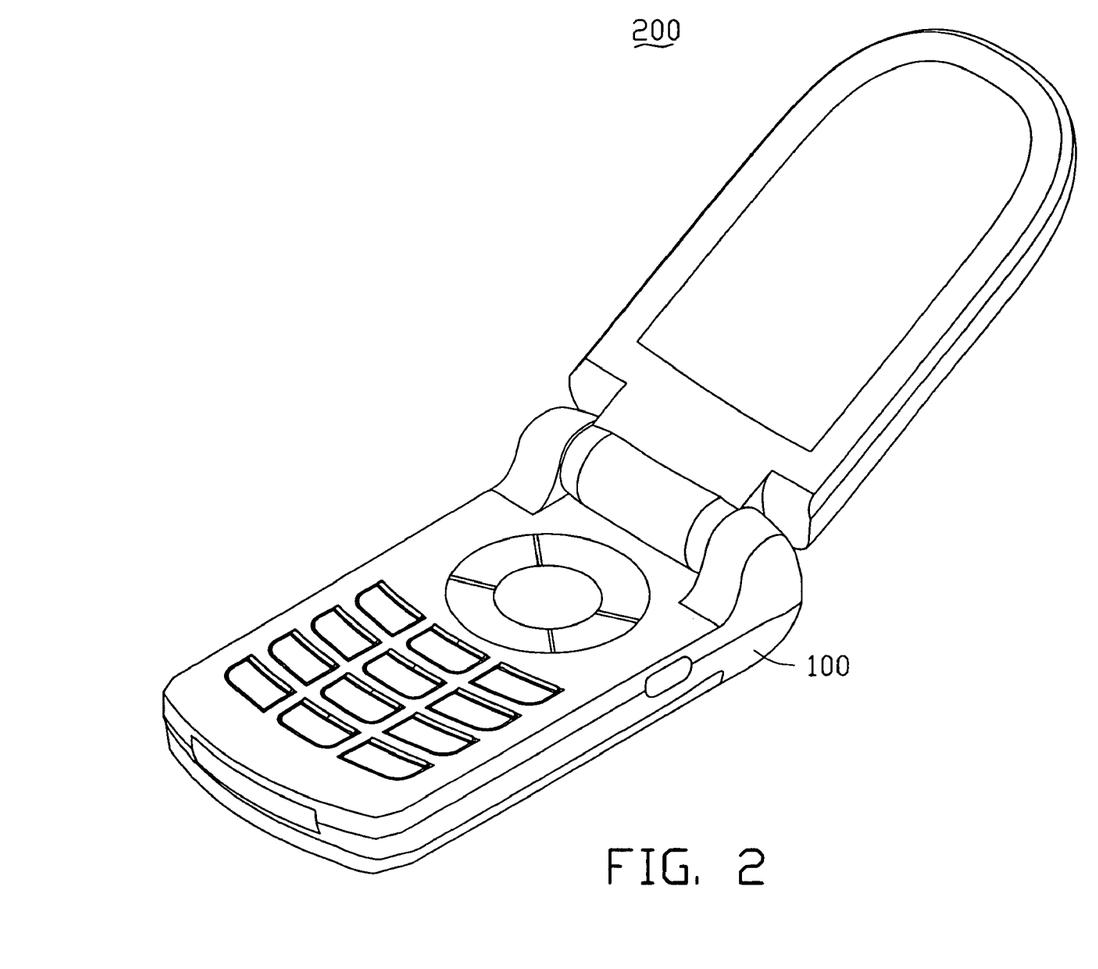
FIG. 2 is an isometric view of a mobile phone accordance with a preferred embodiment of the present invention.
Figure 3:
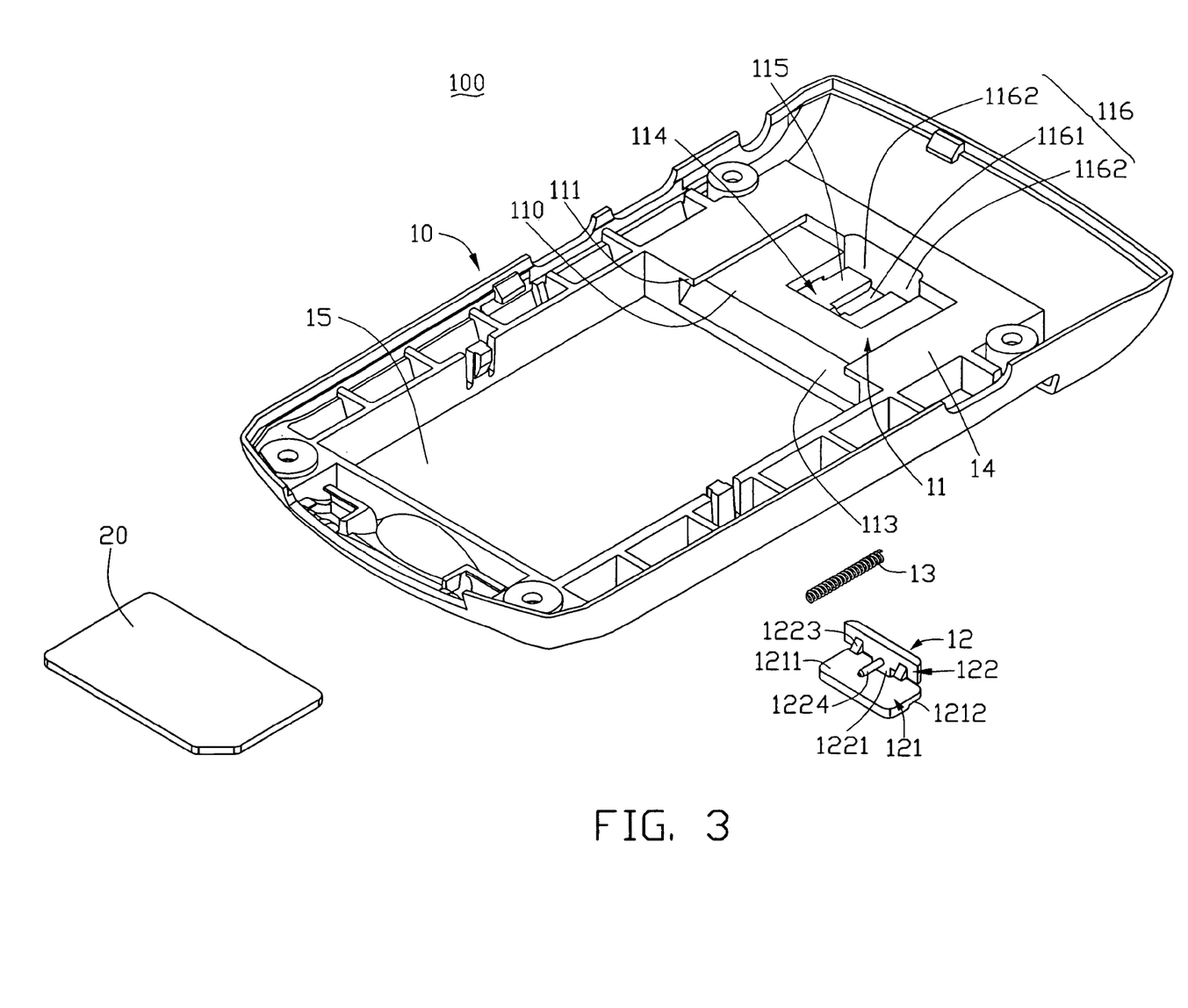
FIG. 3 is an exploded, isometric view of a SIM card latching assembly of FIG. 2.

Referring now to the drawings in detail, FIG. 2 and FIG. 3 show a latching assembly 100 for a SIM card 20 incorporated in a mobile phone/portable electronic device 200. The mobile phone 200 and the SIM card 20 are taken here as an exemplary application for the purposes of describing details of the latching assembly 100 of the preferred embodiment. The mobile phone 200 includes a main body 10. A partition wall 14 and a receiving cavity 15 for receiving a battery (not shown) are formed in the main body 10. The latching assembly 100 includes a receiving portion 11, a latch portion 12, and a spring 13. The receiving portion 11 is formed in the partition wall 14 of the main body 10, adjacent to the receiving cavity 15.

Figure 4:
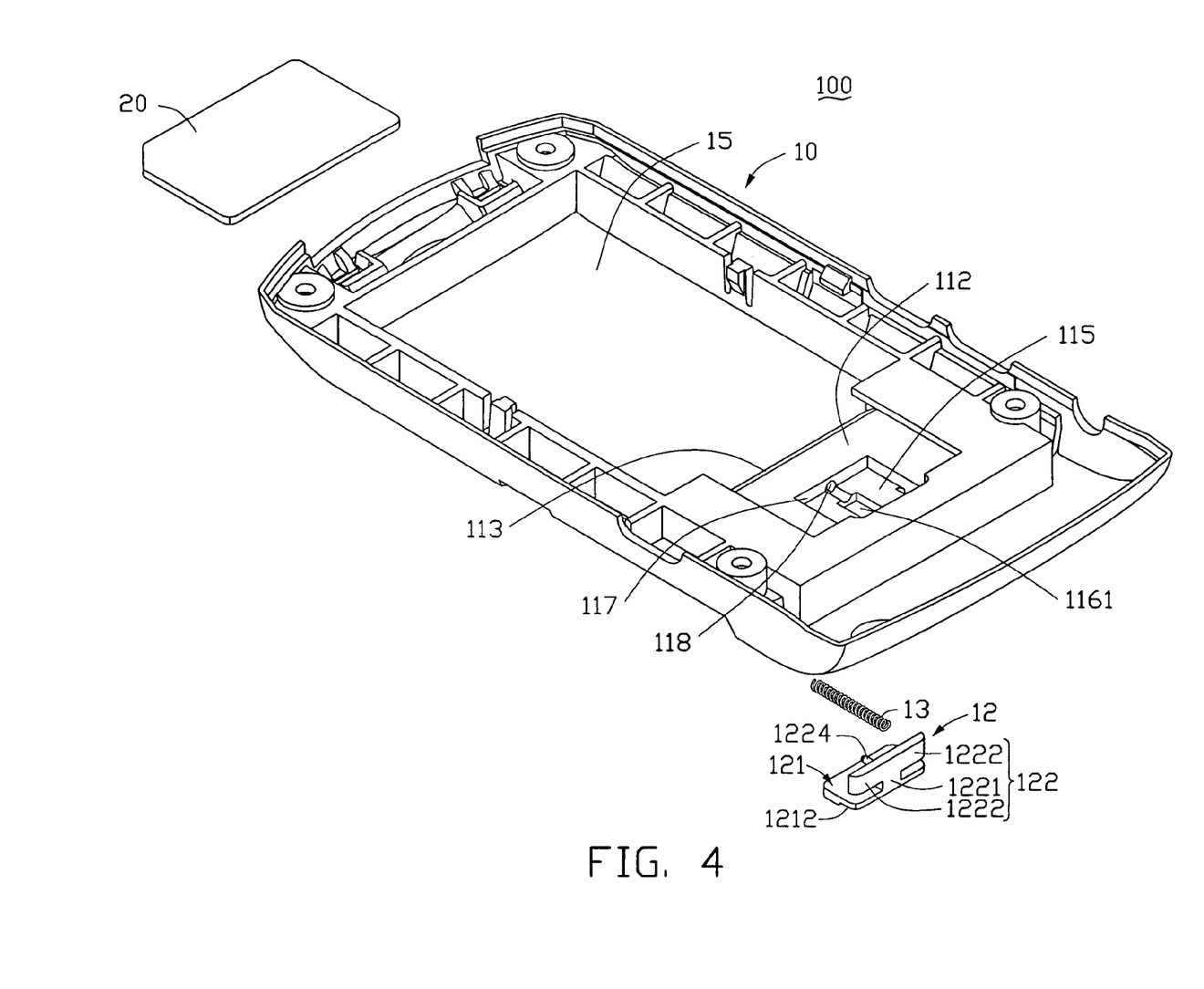
FIG. 4 is similar to FIG. 3, but viewed from another aspect.

Referring also to FIG. 4, the receiving portion 11 defines a receiving space for receiving the SIM card 20, and the shape and size of the receiving portion 11 corresponds to the SIM card 20. The receiving portion 11 includes a receiving groove 110 defined in the partition wall 14 and a pair of symmetrical blocking pieces 111 extending from the partition wall 14 in a manner so as to partially cover the receiving groove 110. The receiving portion 11 has a base 112. An aperture 113 is formed at a first end of the receiving portion 11, adjacent to the receiving cavity 15. The SIM card 20 enters or exits via the aperture 113. A latching containing portion 114 is defined at an opposite second end of the receiving portion 11. The latching containing portion 114 is configured for receiving the latch portion 12. The latching containing portion 114 has a bottom portion 115. A through hole 116 is defined at one end of the latching containing portion 114, apart from the aperture 113 of the receiving portion 11. The through hole 116 extends through the partition wall 14. The through hole 116 is substantially a T-shaped hole, and has a tail hole 1161 extending toward the aperture 113 and a pair of symmetrical arm holes 1162 defined with one at each of two sides of the tail hole 1161. A side surface 117 connected with the base 112 and the bottom portion 115 is perpendicular to the tail hole 1161. A receiving hole 118 is defined approximately in a middle of the side surface 117, facing the tail hole 1161.

The latch portion 12 includes an operation board 121 and a latch board 122 extending from the operation board 121. The operation board 121 has a resisting surface 1211 and an opposite operation surface 1212 apart from the latch board 122. The operation surface 1212 is substantially a step/grip surface, for facilitating pushing of the operation board 121 by a user. The latch board 122 is substantially a T-shaped board, and is engaged in the through hole 116 of the receiving portion 11. The latch board 122 has a tail portion 1221 and a pair of symmetrical arm portions 1222 disposed one on either side of the tail portion 1221. The tail portion 1221 is connected with the latch board 122 and the operation board 121. A length of the tail portion 1221 equal to a distance between the one arm portion 1222 and the operation board 121, and corresponds to a thickness of the bottom portion 115. A width of the tail portion 1221 is less than or equal to that of the tail hole 1161 of the receiving portion 11 that the tail portion 1221 may move along the tail hole 1161. The shape and size of the arm portions 1222 correspond to that of the arm holes 1162. A blocking tab 1223 is disposed at one end of each arm portion 1222, adjacent to the resisting surface 1211 of the operation board 121. Each blocking tab 1223 is substantially wedge-shaped, and made of an elastic material. A resisting rod 1224 is disposed approximately in a middle of the latch board 122. The resisting rod 1224 and the blocking tabs 1223 are all located at one side of the latch board 122, facing the resisting surface 1211 of the operation board 121.

The spring 13 is helical and preferably metallic. An inner diameter of the spring 13 is greater than or equal to a diameter of the resisting rod 1224 of the latch portion 12. An outer diameter of the spring 13 is less than or equal to a diameter of the receiving hole 118 of the receiving portion 11.

Figure 5:
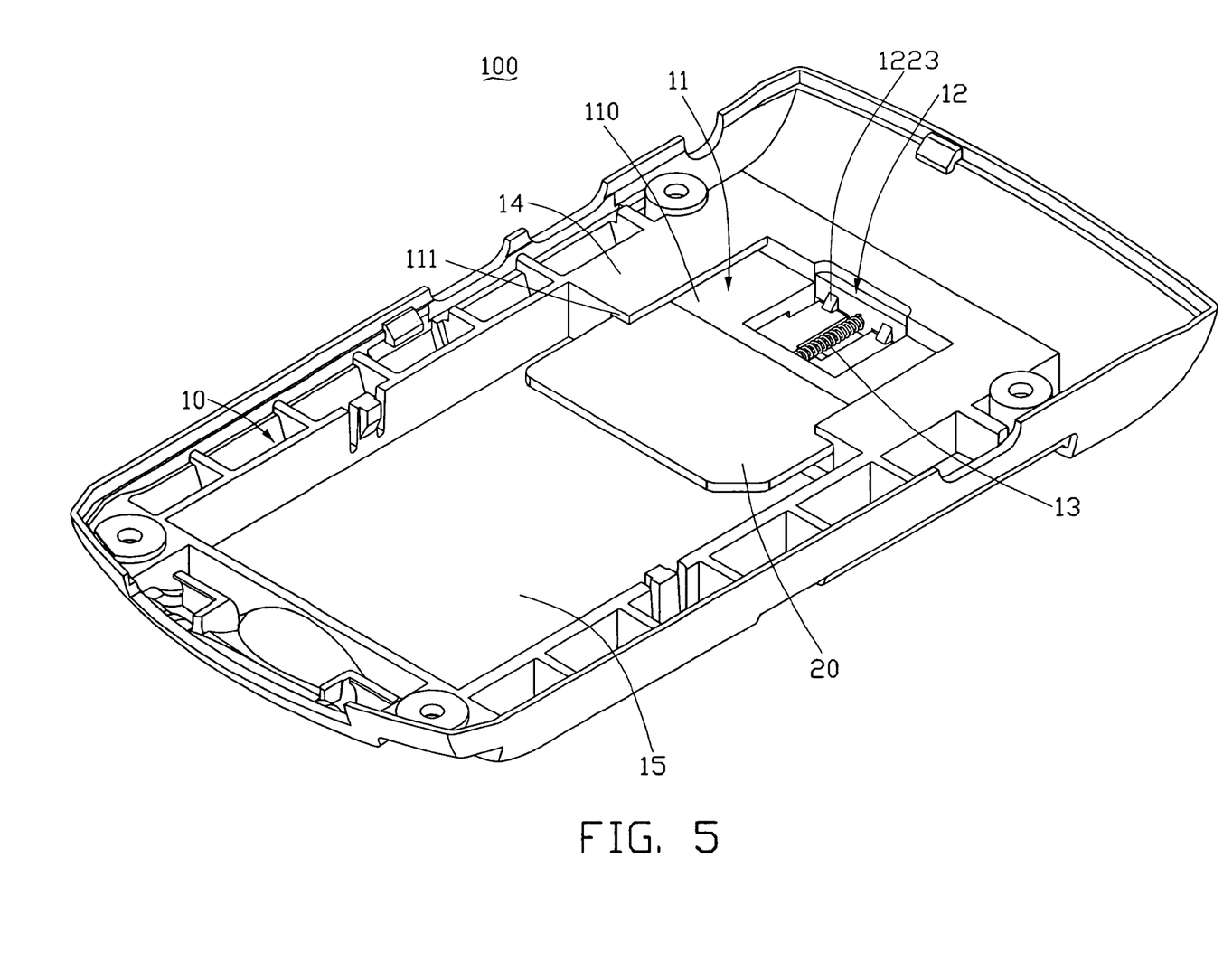
FIG. 5 is an enlarged, isometric view showing the SIM card in a process of being assembled to the latching assembly of FIG. 3.

Referring to FIG. 5, in assembly of the latch portion and the spring, firstly, the latch board 122 aims at the arm holes 1162 of the through hole 116, and the resisting rod 1224 aims at the tail hole 1161 of the through hole 116. The user exerts a force on the latch portion 12 via the operation surface 1212, such that the blocking tabs 1223 of the latch portion 12 are deformed to pass through the arm holes 1162, and located on a first surface of the bottom portion 115. At this time, the resisting surface 1211 of the operation board 121 abuts an opposite second surface of the bottom portion 115, thereby preventing the latch portion 12 from detaching from the main body 10. Secondly, one end of the spring 13 is received in the receiving hole 118. The resisting rod 1224 of the latch portion 12 is received in the other end of the spring 13.

In use, the SIM card 20 is placed at the aperture 113 of the receiving portion 11, and moves by being pushed into the receiving portion 11. The user continues to push the SIM card 20, thus the SIM card 20 is received entirely into the receiving portion 11, with the SIM card 20 abutting the latch board 122 (best seen FIG. 6 and FIG. 7). The battery (not shown) is received in the receiving cavity 15, with the battery abutting the SIM card 20, thus holding the SIM card 20 in a horizontal plane. The blocking pieces 111 can prevent the SIM card 20 from moving upwards off the receiving portion 11. Thus, the SIM card 20 is held steadily in the receiving portion 11. At this time, the latch portion 12 is in its original state.

Figure 6:
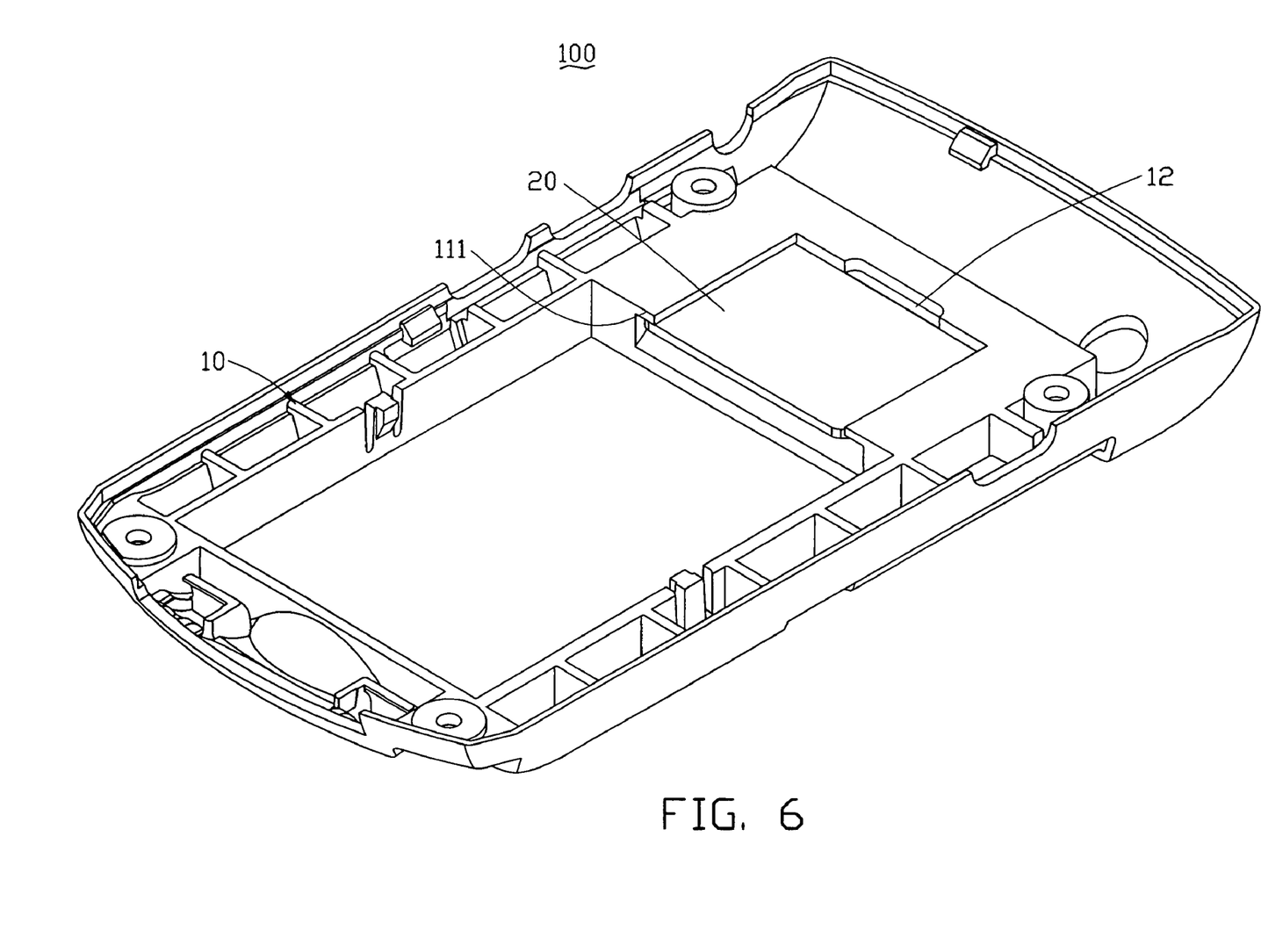
FIG. 6 is similar to FIG. 5, but showing the SIM card fully assembled in the latching assembly.
Figure 7:
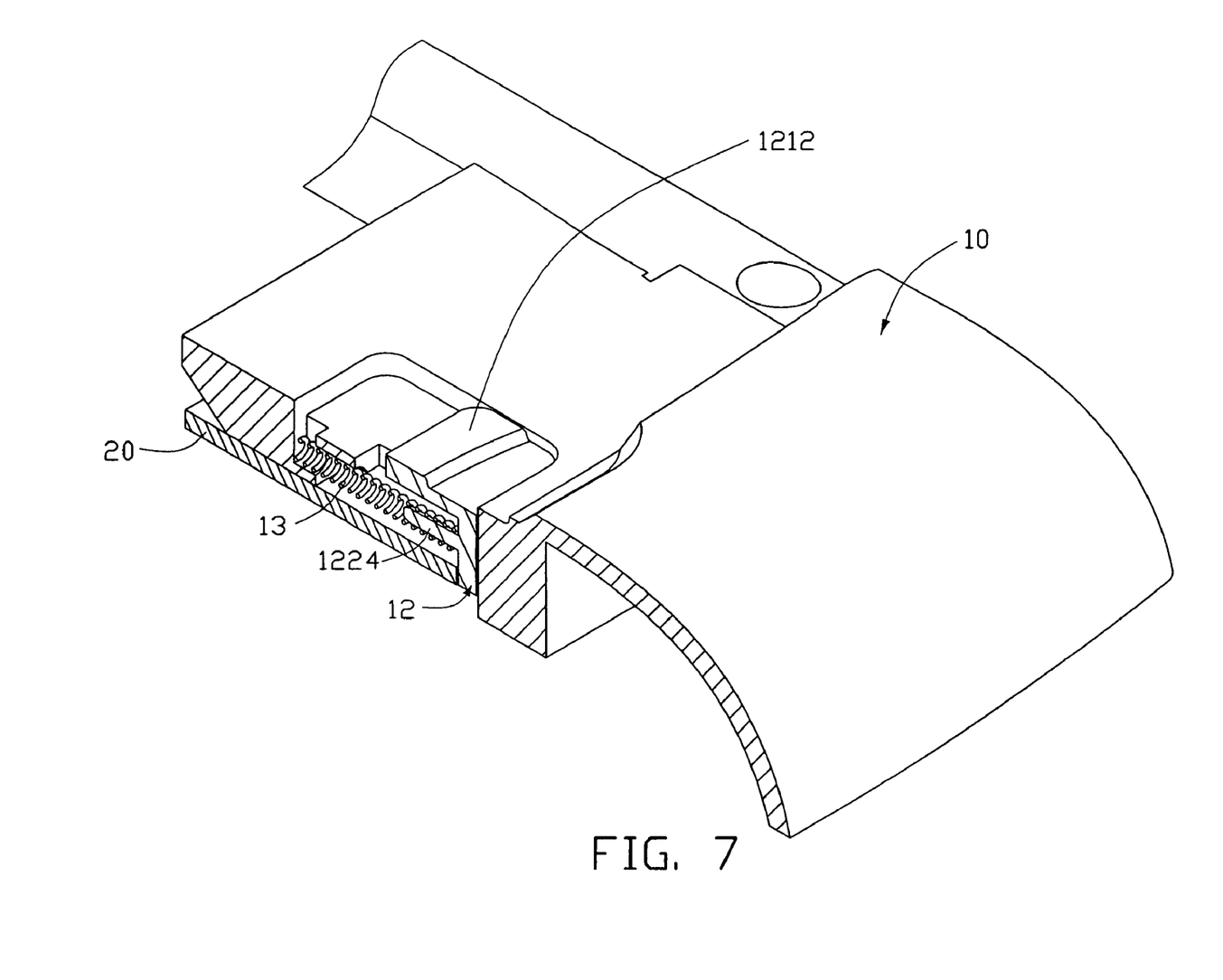
FIG. 7 is an enlarged, isometric, partial cross-sectional view of the latching assembly shown in FIG. 6.

To remove the SIM card 20, the user pushes the operation surface 1212 of the latch portion 12, thus the latch portion 12 is moved toward the aperture 113 in the latching containing portion 114. At the same time, the SIM card 20 is driven to move out of the receiving portion 11 through the aperture 113. The spring 13 is compressed. At this time, the latch portion 12 is in a second state. When the SIM card 20 is moved out of the aperture 113 of the receiving portion 11 it can be readily taken out. The latch portion 12 returns automatically to its original state under a decompression force of the spring 13.

In alternative embodiments, the through hole 116 of the receiving portion 11 could be another suitable shape. Also, the latch board 122 of the latch portion 12 could be of another suitable shape. Furthermore, the spring 13 could be omitted or replaced by another kind of elastic element or urging means known in the art, such as a resilient cylinder.

It is believed that the present embodiments and their advantages will be understood form the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A surface contact card latching assembly in a portable electronic device body, the latching assembly comprising:
   a receiving portion formed on the device body and configured for receiving a surface contact card therein, the receiving portion having an aperture formed at a first end thereof via which the surface contact card enters or exits, and a latching containing portion formed at an opposite second end thereof; and
   a latch portion received in the latching containing portion, the latch portion being operable to move in the latching containing portion so as to drive the surface contact card to move out of the receiving portion through the aperture;
   wherein, the portable electronic device body comprises a partition wall, a through hole extending through the partition wall is defined at one end of the latching containing portion and is apart from the aperture of the receiving portion, the through hole is a T-shaped hole, and has a tail hole extending toward the aperture and a pair of arm holes defined with one at each of two sides of the tail hole.

2. The latching assembly as claimed in claim 1, wherein the receiving portion includes a receiving groove defined in the partition wall and a pair of blocking pieces extending from the partition wall for partially covering the receiving groove.

3. The latching assembly as claimed in claim 1, wherein the receiving portion has a base, the latching containing portion has a bottom portion, a side surface connected with the base and the bottom portion is perpendicular to the tail hole, a receiving hole is defined in the side surface facing the tail hole.

4. The latching assembly as claimed in claim 3, wherein the latch portion includes an operation board and a latch board extending from the operation board, the operation board has a resisting surface and an opposite operation surface apart from the latch board, and the operation surface is a step surface.

5. The latching assembly as claimed in claim 4, wherein the latch board is engaged with the through hole of the receiving portion, the latch board is a T-shaped board, and has a tail portion and a pair of arm portions which are disposed with one on each of sides of the tail portion.

6. The latching assembly as claimed in claim 5, wherein the tail portion is connected with the latch board and the operation board, a length of the tail portion corresponds to a thickness of the bottom portion, a width of the tail portion is less than that of the tail hole of the receiving portion.

7. The latching assembly as claimed in claim 5, wherein the shape and size of the arm portions correspond to that of the arm holes, a wedge-shaped blocking tab is disposed at one end of each arm portion adjacent to the resisting surface of the operation board, each blocking tab is made of an elastic material.

8. The latching assembly as claimed in claim 7, wherein a resisting rod is disposed in a middle of the latch board, the resisting rod and the blocking tabs are all located at one side of the latch board, facing the resisting surface of the operation board.

9. The latching assembly as claimed in claim 8, further comprising a spring, an inner diameter of the spring being greater than a diameter of the resisting rod of the latch portion, and an outer diameter of the spring being less than a diameter of the receiving hole of the receiving portion.

10. The latching assembly as claimed in claim 1, wherein the surface contact card is a SIM card.

11. A latching assembly for latching a card member into a device body, comprising:
   a receiving portion formed on the device body and configured for receiving the card member therein, the receiving portion having an aperture via which the card member enters or exits; and
   a latch portion movably attached to the device body, the latch portion resisting the card member as the card member is positioned in the receiving portion, and configured for driving the card member to move out of the receiving portion through the aperture by pushing the latch portion along a direction toward the aperture;
   wherein the device body comprises a partition wall, the receiving portion includes a receiving groove defined in the partition wall and a pair of blocking pieces extending from the partition wall for partially covering the receiving groove, the receiving portion further includes a latching containing portion formed at a first end thereof, the aperture is formed at an opposite second end thereof;
   wherein, a through hole extending through the partition wall is defined at one end of the latching containing portion and is apart from the aperture of the receiving portion, the through hole is a T-shaped hole, and has a tail hole extending toward the aperture and a pair of arm holes defined with one at each of two sides of the tail hole.

12. The latching assembly as claimed in claim 11, wherein the latch portion includes an operation board and a latch board extending from the operation board, the latch board is engaged with the through hole of the receiving portion, the latch board is a T-shaped board, and has a tail portion and a pair of arm portions disposed with one at each of two sides of the tail portion.

13. The latching assembly as claimed in claim 12, wherein the shape and size of the arm portions correspond to that of the arm holes, a wedge-shaped blocking tab is disposed at one end of each arm portion adjacent to the operation board, each blocking tab is made of an elastic material.

14. A portable electronic device comprising:
   a device body comprising a receiving portion configured for receiving a surface contact card therein and a partition wall; the receiving portion having an aperture formed at a first end thereof via which the surface contact card enters or exits, and a latching containing portion formed at an opposite second end thereof;
   a latch portion movably attached to the device body proximate to the receiving portion, the latch portion configured for driving the surface contact card to move out of the receiving portion; and
   a through hole extending through the partition wall is defined at one end of the latching containing portion and is apart from the aperture of the receiving portion, the through hole is a T-shaped hole, and has a tail hole extending toward the aperture and a pair of arm holes defined with one at each of two sides of the tail hole.

15. The portable electronic device as claimed in claim 14, wherein the receiving portion comprises a latching containing portion formed at at an opposite second end thereof, the latch portion is received in the latching containing portion.

16. The portable electronic device as claimed in claim 15, wherein the latch portion is slidable in the latching containing portion.

17. The portable electronic device as claimed in claim 16, further comprising a spring member biasing the latch portion away from the aperture.

* * * * *